(12) United States Patent
Fero et al.

(10) Patent No.: US 6,899,381 B1
(45) Date of Patent: May 31, 2005

(54) VEHICLE HEADLINER WITH A FLEXIBLE DUCT

(75) Inventors: Mark W. Fero, Clinton Township, MI (US); David J. Prince, Villa Park, IL (US); Justin Putti, Rochester Hills, MI (US); Randall A. Gage, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/748,595

(22) Filed: Dec. 30, 2003

(51) Int. Cl.[7] ............................................. B60R 13/02
(52) U.S. Cl. ....................... 296/214; 296/208; 454/137
(58) Field of Search ................................ 296/208, 210, 296/212, 214; 454/136, 137

(56) References Cited

U.S. PATENT DOCUMENTS

| | | |
|---|---|---|
| 5,622,402 A | 4/1997 | Pritchard et al. |
| 6,062,635 A | 5/2000 | Learman et al. |
| 6,086,145 A | 7/2000 | Wandyez |
| 6,120,090 A | 9/2000 | Van Ert et al. |
| 6,158,796 A | 12/2000 | Weber |
| 6,279,978 B1 | 8/2001 | Schreyer et al. |
| 6,282,911 B1 | 9/2001 | Watanabe et al. |
| 6,315,354 B1 | 11/2001 | Tani et al. |
| 6,322,136 B2 | 11/2001 | Boyce et al. |
| 6,517,147 B2 | 2/2003 | Grimm |
| 6,555,042 B1 | 4/2003 | Mola et al. |
| 6,685,262 B1 * | 2/2004 | Tiesler et al. ............... 296/214 |
| 2002/0030374 A1 | 3/2002 | Myburgh |
| 2002/0145236 A1 | 10/2002 | Wandyez |
| 2002/0195844 A1 | 12/2002 | Hipwell |
| 2003/0096129 A1 * | 5/2003 | Kojima ....................... 428/512 |

* cited by examiner

Primary Examiner—Patricia L. Engle
(74) Attorney, Agent, or Firm—Bill C. Panagos

(57) ABSTRACT

A headliner assembly for a vehicle. The headliner assembly includes a headliner body and a flexible air duct. The headliner body includes a vent aperture and first and second surfaces. The first surface is disposed adjacent to a roof of the vehicle and the second surface is disposed opposite the first surface. The flexible air duct includes an inlet for receiving pressurized air and a duct portion that channels pressurized air from the inlet to the vent aperture. The flexible air duct is attached to the first surface and inflates when air is provided through the inlet and at least partially deflates when air is not provided through the inlet.

20 Claims, 2 Drawing Sheets

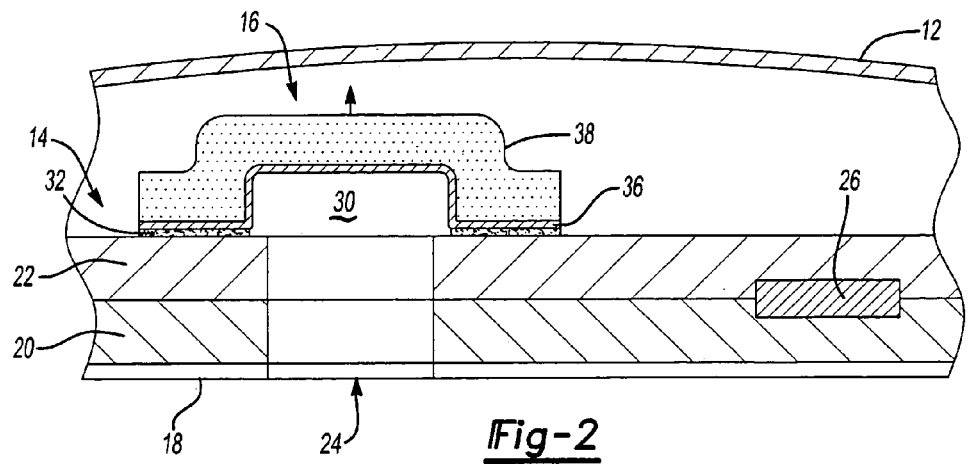
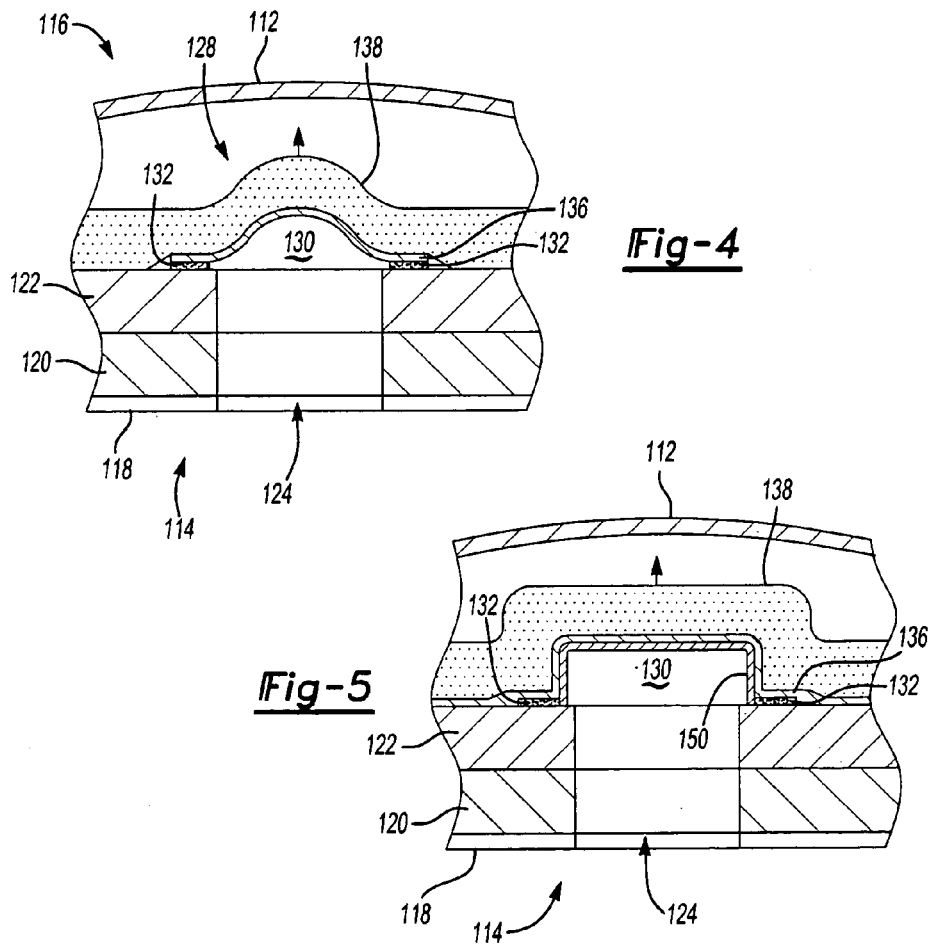

VEHICLE HEADLINER WITH A FLEXIBLE DUCT

BACKGROUND OF THE INVENTION

1. Field of the Invention

The present invention relates to a vehicle headliner having a flexible duct, such as a flexible air duct.

2. Background Art

Automotive headliners incorporating rigid air ducts are known in the art. Examples of rigid air ducts are disclosed in U.S. Pat. Nos. 6,062,635 and 6,086,145. Due to their rigid hollow structure, these air ducts can resonate and easily transmit noise, such as noise resulting from contact with adjacent objects. In addition, rigid structures can degrade audio quality in headliners that incorporate speakers, such as that described in U.S. Pat. No. 6,555,042.

Before applicant's invention, there was a need for a vehicle headliner assembly that incorporated a flexible air duct to reduce transmission of unwanted noise and improve the performance of audio systems having speakers incorporated into the headliner assembly. Problems associated with the prior art as noted above and other problems are addressed by applicant's invention as summarized below.

SUMMARY OF THE INVENTION

According to one aspect of the invention, a headliner assembly for a vehicle is provided. The headliner assembly includes a headliner body having first and second surfaces. The first surface is configured to face toward a roof of the vehicle. The second surface is disposed opposite of the first surface. A flexible air duct is attached to the first surface. The flexible air duct includes an inlet for receiving pressurized air and a duct portion. The flexible air duct inflates when air is provided through the inlet and at least partially deflates when air is not provided through the inlet.

The flexible air duct may include first and second flexible layers. The first flexible layer may be a polyethylene film that inhibits air leakage. The second flexible layer may be a lofted polyester material or a woven material that is attached to the first flexible layer. The second flexible layer may be thicker than the first flexible layer and be partially compressed to maintain a desired shape when air is not provided through the inlet.

The flexible air duct may be attached to the first surface by an adhesive or by vibration welding. A vent aperture may extend through the headliner body and receive air from the flexible air duct.

A support member may be provided for supporting a section of the flexible air duct when the flexible air duct is at least partially deflated.

According to another aspect of the invention, a headliner assembly for a vehicle is provided. The headliner assembly includes a headliner body and a flexible air duct. The headliner body has a plurality of material layers disposed substantially parallel to each other. A vent aperture and a speaker are disposed in the plurality of material layers. The headliner body also includes an upper surface disposable adjacent to a vehicle roof and a lower surface disposed opposite the upper surface. The flexible air duct is attached to the upper surface along a perimeter to define an air conduit. The flexible air duct is configured to inhibit resonance in response to an audio signal from the speaker.

The flexible air duct of the above embodiment may be inflated when pressurized air is provided through an inlet and partially deflated when pressurized air is not provided.

According to another aspect of the invention, a headliner assembly for a vehicle is provided. The headliner assembly includes a headliner body and a flexible body. The headliner body includes a first surface disposed adjacent to a roof of the vehicle, a second surface disposed opposite the first surface, and a vent aperture passing through the first and second surfaces. The flexible body includes a flexible insulation layer and a flexible barrier layer disposed between the flexible insulation layer and the first surface. A portion of the flexible barrier layer is attached to the first surface to define a flexible air duct that inflates when air is provided through an inlet and deflates when air is not provided through the inlet.

The flexible barrier layer may be disposed on a section of the flexible insulation layer and may be attached to the flexible insulation layer and the first surface. An area of the flexible barrier layer located apart from the flexible air duct may be perforated.

The flexible insulation layer may be partially compressed to retain a shape in an area adjacent to the flexible air duct. The flexible insulation layer may cover substantially all of the first surface.

BRIEF DESCRIPTION OF THE DRAWINGS

FIG. 2 is a section view of a portion of the headliner assembly shown in FIG. 1;

FIG. 4 is a section view of a portion of the headliner assembly shown in FIG. 3; and FIG. 5 is a section view of another embodiment of the headliner assembly.

DETAILED DESCRIPTION OF THE PREFERRED EMBODIMENT(S)

Figure 1:
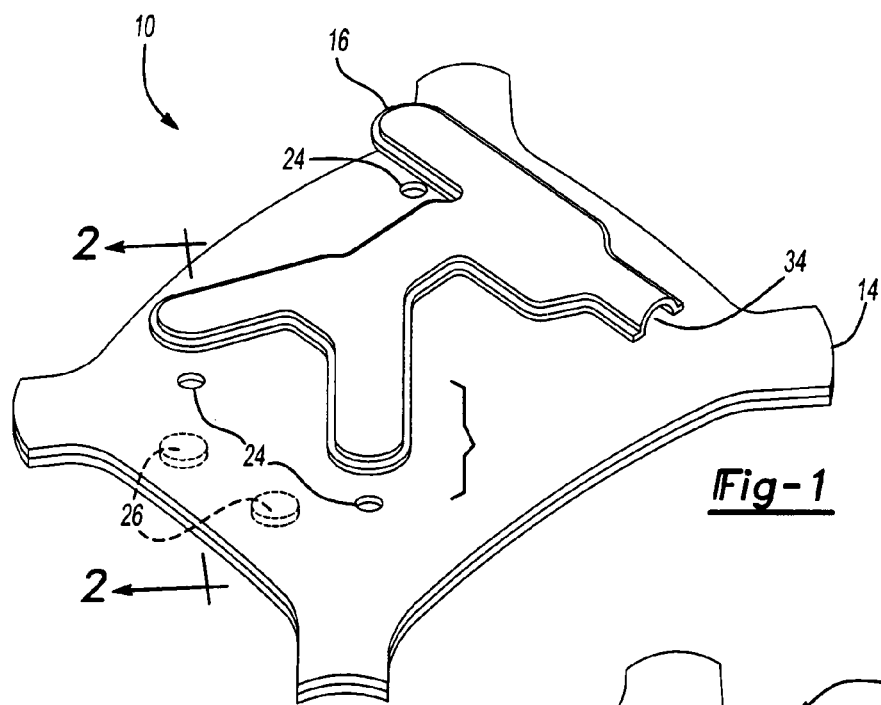
FIG. 1 is a partially exploded perspective view of a headliner assembly.

Referring to FIGS. 1 and 2, a vehicle headliner assembly 10 is shown. The headliner assembly 10 may be used in any suitable vehicle, such as an automobile or truck, and may be configured to mount to the vehicle in a position generally covering an interior surface of a passenger compartment roof 12.

The headliner assembly 10 includes a headliner body 14 and a flexible air duct 16. The headliner body 14 may have any suitable construction and may include one or more material layers. In the embodiment shown in FIG. 2, the headliner body 14 is a laminate that includes a decorative fabric layer 18, a foam layer 20, and a support layer 22. The headliner body 14 may also include additional components such as sun visors, overhead consoles, handles, lights, and/or a sunroof opening.

The headliner body 14 also includes one or more vent apertures 24. Directional air output registers (not shown) that allow passengers to direct air to various parts of the vehicle passenger compartment may be rotatably mounted in each vent aperture 24.

In addition, the headliner body 14 may have one or more speakers 26. The speakers may be of any suitable type, such as those disclosed in U.S. Pat. No. 6,555,042, which is incorporated by reference in its entirety. The speakers 26 may be positioned between or within the material layers of the headliner body 14. In the embodiment shown in FIG. 2, the speaker 26 is disposed between the foam layer 20 and the support layer 22. The speakers 26 may be electrically connected to a vehicle audio system by wires, such as flat ribbon wiring (not shown).

With continued reference to FIGS. 1 and 2, one embodiment of the flexible air duct 16 is shown. The flexible air duct 16 is attached to the headliner body 14 adjacent to the roof 12 to define an air conduit 30 for supplying air to the vent apertures 24. The air conduit 30 may have any suitable shape or configuration. In the embodiment shown in FIG. 2, the perimeter of the flexible air duct 16 is attached to the headliner body 14 with an adhesive 32. However, the flexible air duct 16 may be attached to the headliner body 14 in any suitable manner, such as with a pressure sensitive caulk, sonic welding, vibration welding, and/or with a hook and loop fastener like Velcro™.

The flexible air duct 16 includes an air inlet 34. The inlet 34 is disposed adjacent to a peripheral edge of the headliner body 12 and is configured to receive air from a vehicle air handling system, such as a heating, ventilating, and air conditioning (HVAC) system. In the embodiment shown, the inlet 34 is formed where a portion of the perimeter of the flexible air duct 16 is not attached to the headliner body 14. The flexible air duct 16 at least partially expands or inflates when air is provided through the inlet 34 and at least partially deflates when air is not provided through the inlet 34. For example, the flexible air duct 16 may expand toward the roof 12 in the direction shown by the arrow in FIG. 2 when pressurized air is provided to the inlet 34.

The flexible air duct 16 may have one or more flexible layers. Optionally, the flexible air duct 16 may be made of one or more pieces connected together by any suitable manner, such as with an adhesive or by sewing. In the embodiment shown in FIG. 2, the flexible air duct 16 is made of a laminate that includes a barrier or first layer 36 and a insulator or second layer 38. The first layer 34 inhibits air leakage and may be made of any suitable material, such as a polyethylene film, vinyl, or rubber. The second layer 38 may provide acoustic insulation and may be made of any suitable material, such as a lofted polyester material or a woven material. In addition, the second layer 38 may be partially compressed to retain a shape and may be stiffer than the first layer. For example, the second layer 38 may be vacuum formed to retain a shape, yet retain flexibility. Alternately, the flexible air duct 16 may be made of a single material that inhibits air leakage.

The flexible air duct 16 provides various acoustic functions and benefits. For example, the flexible air duct does not rattle or buzz and does not support air resonances (e.g., air wave propagation) within the audible range. The structural resonances of the flexible duct are well damped. Also, the flexible air duct does not significantly affect the structural acoustics of the headliner. These functions and benefits may be more apparent when the flexible air duct in employed with a headliner that incorporates speakers.

The flexible air duct 16 may be made of an opaque material that is darkly tinted to obscure visibility of the flexible air duct 16 through the vent apertures 24 by vehicle occupants. Alternately, a coating, such as paint, or a dark colored material may be disposed on the interior surface of the flexible air duct 16 near the vent aperture 24 to make the flexible air duct 16 less noticeable to vehicle occupants.

Figure 3:
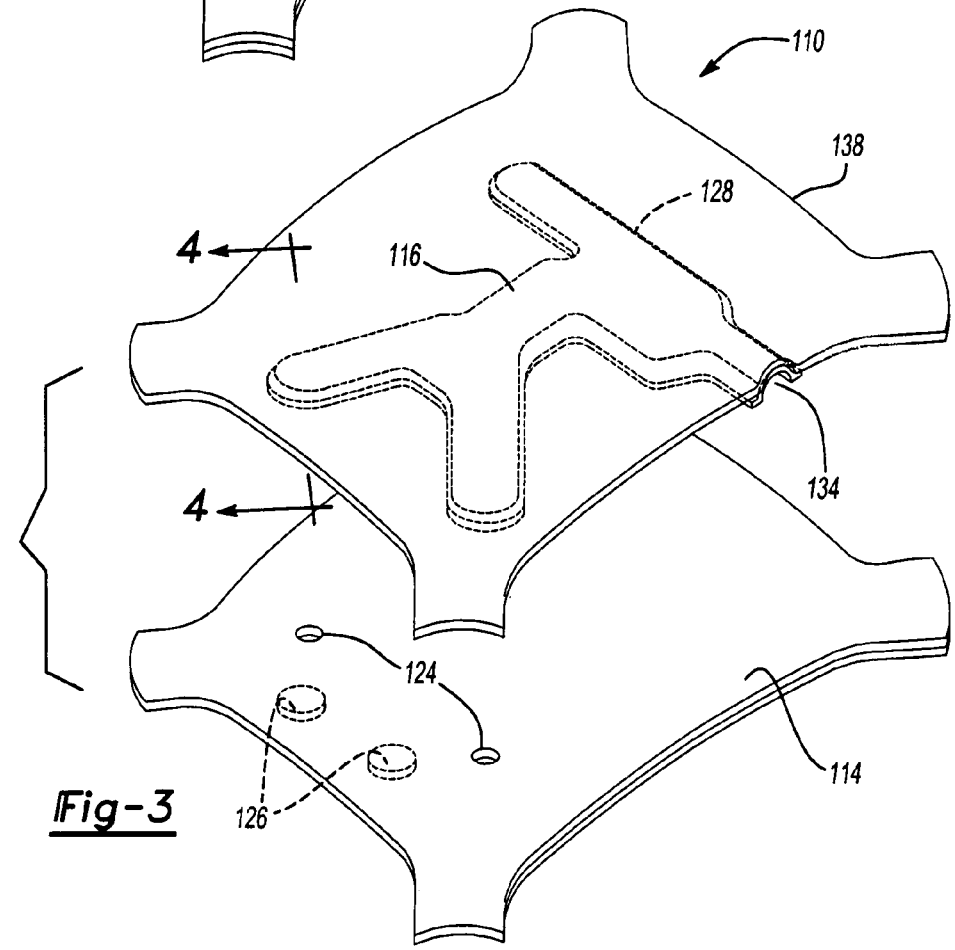
FIG. 3 is a partially exploded perspective view of another embodiment of the headliner assembly.

Referring to FIGS. 3 and 4, another embodiment of the headliner assembly is shown. In this embodiment, the headliner assembly 110 is mounted adjacent to a vehicle roof 112 and includes a headliner body 114 and a flexible body 116. The headliner body 114 may be a laminate having a decorative fabric layer 118, a foam layer 120, and a support layer 122 and may include one or more vent apertures 124 and/or speakers 126 as previously described.

The flexible body 116 includes an air duct portion 128. In the embodiment shown in FIG. 4, the air duct portion 128 is attached to the headliner body 114 adjacent to the roof 112 to define an air conduit 130 for supplying air to the vent apertures 124. The perimeter of the air duct portion 128 is attached to the headliner body 114 with an adhesive 132. The air duct portion 128 includes an air inlet 134 configured to receive air from a vehicle air handling system. The air duct portion 128 at least partially expands when pressurized air is provided through the inlet 134 and at least partially deflates when pressurized air is not provided through the inlet 134. For example, the flexible air duct 116 may expand toward the roof 112 in the direction shown by the arrow in FIG. 4 when pressurized air is provided to the inlet 134.

The flexible body 116 may have one or more flexible layers. In the embodiments shown in FIGS. 4 and 5, the flexible body 116 includes first and second layers 136, 138. The first layer 136 may be disposed on a portion of the second layer 138 and define the perimeter of the air duct portion 128, as shown in FIG. 4. In this embodiment, a portion of the first layer 136 may be attached to the support layer 122. Alternately, the first layer 136 may extend beyond the air duct portion 128 and cover the support layer 122 as shown in FIG. 5. Optionally, the portion of the first layer 136 that extends past the air duct portion 128 may include holes or perforations. The second layer 138 may extend across the headliner body 114 to provide acoustic insulation and improve the audio performance of a headliner assembly that incorporates speakers 126.

Referring to FIG. 5, a headliner assembly incorporating a support member 150 is shown. The support member 150 provides localized support for the air duct portion 128 to prevent a segment of the air conduit 130 from deflating when air is not provided through the inlet 134. In one embodiment, the support member 150 is disposed adjacent to the first layer 136. Alternately, the support member 150 may be disposed between the first and second layers 136, 138 or attached to the second layer 138 adjacent to the roof 112. One or more support members 150 may be employed. The support member 150 may have any suitable configuration, such as a generally U-shaped structure, and may be made of any suitable material, such as metal or plastic.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A headliner assembly for a vehicle, the headliner assembly comprising:
   a headliner body having first and second surfaces, the first surface being configured to face toward a roof of the vehicle and the second surface being disposed opposite the first surface; and
   a flexible air duct attached to the first surface, the flexible air duct having an inlet for receiving pressurized air and a duct portion that channels the pressurized air;
   wherein the flexible air duct inflates when air is provided through the inlet and at least partially deflates when air is not provided through the inlet.

2. The headliner assembly of claim 1 wherein the flexible air duct includes a first flexible layer that inhibits air leakage and a second flexible layer attached to and thicker than the first flexible layer, the second flexible layer being partially compressed to increase density of the second flexible layer and to maintain a desired shape when air is not provided through the inlet.

3. The headliner assembly of claim 2 wherein the first flexible layer is a polyethylene film.

4. The headliner assembly of claim 2 wherein the second flexible layer is a lofted polyester material.

5. The headliner assembly of claim 2 wherein the second flexible layer is a woven material.

6. The headliner assembly of claim 1 further comprising a support member for supporting a section of the flexible air duct when the flexible air duct is at least partially deflated.

7. The headliner assembly of claim 1 wherein the flexible air duct is attached to the first surface by an adhesive.

8. The headliner assembly of claim 1 wherein the flexible air duct is attached to the first surface by vibration welding.

9. The headliner assembly of claim 1 further comprising a vent aperture extending through the headliner body that receives pressurized air from the flexible air duct.

10. A headliner assembly for a vehicle, the headliner assembly comprising:
a headliner body having a plurality of material layers disposed substantially parallel to each other, the headliner body including:
an upper surface disposable adjacent to a vehicle roof;
a lower surface disposed opposite the upper surface;
a vent aperture disposed in the plurality of material layers; and
a speaker disposed in the plurality of material layers; and
a flexible air duct having a perimeter attached to the upper surface to define an air conduit;
wherein the flexible air duct is configured to inhibit resonance in response to an audio signal from the speaker.

11. The headliner assembly of claim 10 wherein the flexible air duct is inflated when pressurized air is provided through an inlet and partially deflated when pressurized air is not provided through the inlet.

12. The headliner assembly of claim 11 wherein the flexible air duct inhibits noise transmission when deflated.

13. The headliner assembly of claim 10 wherein the flexible air duct has a first flexible layer for inhibiting air leakage and a second flexible layer disposed opposite the first flexible layer, the second flexible layer having a perimeter attached to the upper surface to define the air conduit.

14. The headliner assembly of claim 13 wherein the second layer is partially compressed to retain a predetermined shape.

15. A headliner assembly for a vehicle, the headliner assembly comprising:
a headliner body including:
a first surface disposed adjacent to a roof of the vehicle;
a second surface disposed opposite the first surface; and
a vent aperture passing through the first and second surfaces; and
a flexible body including:
a flexible insulation layer for providing acoustic insulation; and
a flexible barrier layer for inhibiting air leakage disposed between the flexible insulation layer and the first surface;
wherein a portion of the flexible barrier layer is attached to the first surface to define a flexible air duct that inflates when air is provided through an inlet and deflates when air is not provided through the inlet.

16. The headliner assembly of claim 15 wherein the flexible insulation layer covers substantially all of the first surface of the headliner body.

17. The headliner assembly of claim 15 wherein the flexible barrier layer is disposed on a section of the flexible insulation layer.

18. The headliner assembly of claim 15 wherein an area of the flexible barrier layer located apart from the flexible air duct is perforated.

19. The headliner assembly of claim 15 wherein the flexible insulation layer is partially compressed to retain a shape in an area adjacent to the flexible air duct.

20. The headliner assembly of claim 15 further comprising a speaker disposed in the headliner body wherein the flexible body does not resonate in response to an audio signal from the speaker.

* * * * *